United States Patent
Chen et al.

(10) Patent No.: US 8,756,947 B2
(45) Date of Patent: Jun. 24, 2014

(54) TRANSPORT REFRIGERATION SYSTEM AND METHOD OF OPERATION

(75) Inventors: Yu H. Chen, Manlius, NY (US); Lucy Yi Liu, Fayetteville, NY (US)

(73) Assignee: Carrier Corporation, Farmington, CT (US)

( * ) Notice: Subject to any disclaimer, the term of this patent is extended or adjusted under 35 U.S.C. 154(b) by 1001 days.

(21) Appl. No.: 12/741,437

(22) PCT Filed: Nov. 5, 2008

(86) PCT No.: PCT/US2008/082461
§ 371 (c)(1),
(2), (4) Date: May 5, 2010

(87) PCT Pub. No.: WO2009/061804
PCT Pub. Date: May 14, 2009

(65) Prior Publication Data
US 2010/0263393 A1     Oct. 21, 2010

Related U.S. Application Data

(60) Provisional application No. 61/002,604, filed on Nov. 9, 2007.

(51) Int. Cl.
*F25B 5/00*     (2006.01)
*F25B 49/00*     (2006.01)

(52) U.S. Cl.
USPC .......................................... 62/228.4; 62/117

(58) Field of Classification Search
USPC ................................................ 62/117, 228.4
See application file for complete search history.

(56) References Cited

U.S. PATENT DOCUMENTS

| | | | | |
|---|---|---|---|---|
| 3,010,289 A * | 11/1961 | Kuklinski | ..................... | 62/196.1 |
| 4,787,211 A * | 11/1988 | Shaw | ................................ | 62/117 |
| 6,058,729 A * | 5/2000 | Lifson et al. | ..................... | 62/217 |
| 6,530,238 B2 * | 3/2003 | Hansen | ......................... | 62/228.4 |
| 6,619,062 B1 * | 9/2003 | Shibamoto et al. | ........... | 62/228.3 |
| 6,688,125 B2 * | 2/2004 | Okamoto et al. | ............... | 62/239 |

(Continued)

FOREIGN PATENT DOCUMENTS

| JP | 5676179 | 6/1981 |
|---|---|---|
| JP | S59211784 A | 11/1984 |

(Continued)

OTHER PUBLICATIONS

The International Bureau of WIPO, Patent Cooperation Treaty, International Preliminary Report on Patentability, dated May 11, 2010, (6 pgs.).

*Primary Examiner* — Alexandra Elve
*Assistant Examiner* — Henry Crenshaw
(74) *Attorney, Agent, or Firm* — Cantor Colburn LLP

(57) ABSTRACT

A refrigeration system for a transport refrigeration unit and a method of operating the refrigeration system for cooling a temperature controlled cargo space are disclosed. The refrigeration system includes a primary refrigerant circuit including a refrigerant compression device, a motor for driving the compression device; a variable speed drive for varying the speed of operation of the compression device; and a controller operatively associated with the variable speed drive and the compression device. The controller controls the cooling capacity of the refrigeration system by selectively controlling the speed of said compression device in a first continuous run mode of operation and by selectively powering on and powering off said compression device in a first cycling mode of operation.

15 Claims, 3 Drawing Sheets

(56) References Cited

U.S. PATENT DOCUMENTS

| | | | |
|---|---|---|---|
| 6,827,104 B2 * | 12/2004 | McFarland | 137/624.13 |
| 6,860,114 B2 * | 3/2005 | Jacobsen | 62/196.4 |
| 8,424,326 B2 * | 4/2013 | Mitra et al. | 62/196.1 |
| 2002/0088241 A1 * | 7/2002 | Suitou et al. | 62/228.4 |
| 2003/0000237 A1 * | 1/2003 | Hansen | 62/228.4 |
| 2003/0106332 A1 * | 6/2003 | Okamoto et al. | 62/239 |
| 2004/0065100 A1 * | 4/2004 | Jacobsen | 62/228.1 |
| 2005/0044885 A1 | 3/2005 | Pearson | |
| 2005/0115258 A1 | 6/2005 | Violand et al. | |
| 2005/0247071 A1 | 11/2005 | Nemit | |
| 2005/0252226 A1 * | 11/2005 | Seefeldt | 62/238.7 |

FOREIGN PATENT DOCUMENTS

| | | |
|---|---|---|
| JP | 61197957 A | 9/1986 |
| JP | 9217974 A | 8/1997 |
| JP | 11083274 A | 3/1999 |
| JP | 2002081821 A | 3/2002 |
| JP | 2002195673 A | 7/2002 |
| JP | 2004116995 A | 4/2004 |
| JP | 2005226980 A | 8/2005 |
| JP | 2005315506 A | 11/2005 |
| JP | 2006132807 A | 5/2006 |

* cited by examiner

US 8,756,947 B2

TRANSPORT REFRIGERATION SYSTEM AND METHOD OF OPERATION

CROSS-REFERENCE TO RELATED APPLICATION

Reference is made to and this application claims priority from and the benefit of U.S. Provisional Application Ser. No. 61/002,604, filed Nov. 9, 2007, entitled "TRANSPORT REFRIGERATION SYSTEM AND METHOD OF OPERATION", which application is incorporated herein in its entirety by reference.

FIELD OF THE INVENTION

This invention relates generally to transport refrigeration systems and, more particularly, to improving system efficiency.

BACKGROUND OF THE INVENTION

Refrigerant vapor compression systems are well known in the art and commonly used for conditioning air to be supplied to a climate controlled comfort zone within a residence, office building, hospital, school, restaurant or other facility. Refrigerant vapor compression system are also commonly used in refrigerating air supplied to display cases, merchandisers, freezer cabinets, cold rooms or other perishable/frozen product storage areas in commercial establishments. Refrigerant vapor compression systems are also commonly used in transport refrigeration systems for refrigerating air supplied to a temperature controlled cargo space of a truck, trailer, container or the like for transporting perishable/frozen items by truck, rail, ship or intermodal.

Unlike conventional refrigeration systems used in stationary applications, transport refrigeration systems, such as those used in trucks/trailers and refrigerated containers, operate in very unpredictable and changing environments. In operation, transport refrigeration units may be exposed to ambient temperature and humidity conditions that vary widely over the course of a day and over different seasons throughout the year and in different geographical locations and climates. Also, the nature of the product stored in the temperature controlled cargo space associated with the refrigeration system may vary dramatically and unpredictably. For example, on one trip, the product being shipped in the cargo space may be deep frozen seafood, and on the next trip, the product being shipped in the cargo space may be bananas, or other fruits and vegetables freshly picked.

Generally, products loaded into the cargo space of a container or trailer from a warehouse have already been cooled to the desired product storage temperature within a refrigeration facility at the warehouse. When the chilled or frozen products have been transferred into the cargo space, the container or trailer doors are closed and the refrigeration unit is operated in a "pull down" mode to rapidly reduce the air temperature within the cargo space from ambient or near ambient temperature down to the desired product storage temperature for transport. In conventional practice, the refrigeration unit is typically designed with a refrigeration capacity sized to provide stable temperature at a low box temperature desired for a frozen product and even a deep frozen product, which would be at least as low as 0° C. (32° F.) and as low as −18° C. (about 0° F.) for a deep frozen product.

However, when product which has not been pre-cooled, such as for example fresh fruits and vegetables direct from the field, the product is loaded into the cargo space of the container or trailer "hot", for example at ambient outdoor temperature, a substantial refrigeration load is imposed upon the transport refrigeration system operating in the pull down mode. The refrigeration system must not only reduce the temperature of the air within the cargo space, but also to reduce the temperature of the product from ambient outdoor temperature down to the desired product storage temperature. Products loaded "hot" require the refrigeration unit to pull the product temperature down to set point temperature, typically about 2° C. (about 36° F.) from product temperatures ranging as high as 38° C. (100° F.) or above.

During pull down, the refrigerant system requires high refrigerant mass flow to produce the required cooling capacity to cool the cargo space and the product down as rapidly as possible. Thus, the refrigerant compressor must operate at or near its maximum load capacity. However, the refrigeration system must also be capable of operating efficiently over a wide range of lower cooling capacities for maintaining the steady-state temperature within the cargo space within a relatively narrow range of the desired product storage temperature despite changing ambient conditions. The desired product storage temperature will vary depending upon the product being shipped. For example, in the case of bananas, the temperature within the cargo space would be held at a relatively constant temperature of 14° C. (57° F.). In such an application, the refrigeration system operates at a very low capacity to match cooling demand, which means that the compressor will operate at very low refrigerant mass flow rates as compared to the refrigerant mass flow rates at which the compressor operates during pull down.

SUMMARY OF THE INVENTION

In an aspect of the invention, a refrigeration system for a transport refrigeration unit for cooling a temperature controlled cargo space, the refrigeration system comprising: a primary refrigerant circuit including a refrigerant compression device, a refrigerant heat rejection heat exchanger, a primary expansion device and a refrigerant heat absorption heat exchanger; a motor for driving the compression device; a variable speed drive operatively associated with the motor for varying the speed of operation of the compression device; and a controller operatively associated with the variable speed drive and the compression device for controlling a cooling capacity of the refrigeration system by selectively controlling the speed of the compression device in a first continuous run mode of operation and by selectively powering on and powering off the compression device in a first cycling mode of operation. In an embodiment, the refrigeration system operates in a transcritcial refrigeration cycle with carbon dioxide as a refrigerant.

The refrigeration system may also include an economizer refrigerant circuit including an economizer disposed in the primary refrigerant circuit downstream of the refrigerant heat rejection heat exchanger and upstream of the primary expansion device, a secondary expansion device disposed circuit downstream of the refrigerant heat rejection heat exchanger and upstream of the economizer, an economizer refrigerant line establishing refrigerant flow communication between the economizer and an intermediate pressure stage of the compression device, and a refrigerant flow control valve disposed in the economizer refrigerant line. In an embodiment, the economizer comprises a flash tank. In an embodiment, the economizer comprises a refrigerant-to-refrigerant heat exchanger.

The controller may include a switching circuit for selectively switching operation of the compressor between a fixed speed operating mode and a variable speed operating mode. The controller may match the cooling capacity of the refrigeration system to a cooling demand associated with the cargo space over a range of operation from a maximum cooling capacity associated with temperature pull down in the cargo space to a minimum cooling capacity associated with temperature maintenance in the cargo space at part load operation. The motor may be a variable frequency controlled motor.

In an aspect of the invention, a method is provided for operating a refrigeration system for a transport refrigeration unit for cooling a temperature controlled cargo space, the refrigeration system including a refrigerant compression device and a motor operatively associated with the compression device for driving the compression device, the method comprising the steps of: providing a variable speed drive for controlling the speed of operation of the motor to selectively varying a speed of the refrigerant compressor; and providing a controller operatively associated with the variable speed drive, the controller determining whether to operate the refrigeration system in a pull down mode, in a capacity mode or in a part load mode in response to temperature control requirements and whether to operate the refrigerant compressor at a fixed speed or a variable speed to match a cooling capacity of the refrigeration system to a cooling demand associated with the cargo space in each of the pull down mode, the capacity mode and the part load mode.

The method may include operating the refrigerant compressor at a fixed speed in the capacity mode. The method may include the further steps of: operating the refrigerant compressor in a continuous run mode in the pull down mode; operating the refrigerant compressor in a power on/off cycling mode in the capacity mode; operating the refrigerant compressor in a continuous run, variable speed mode in a first portion of the part load mode; and operating the refrigerant compressor in a power on/off cycling run, fixed speed mode in a second portion of the part load mode.

BRIEF DESCRIPTION OF THE DRAWINGS

For a further understanding of the invention, reference will be made to the following detailed description of the invention which is to be read in connection with the accompanying drawing, where.

DETAILED DESCRIPTION OF THE INVENTION

Figure 1:
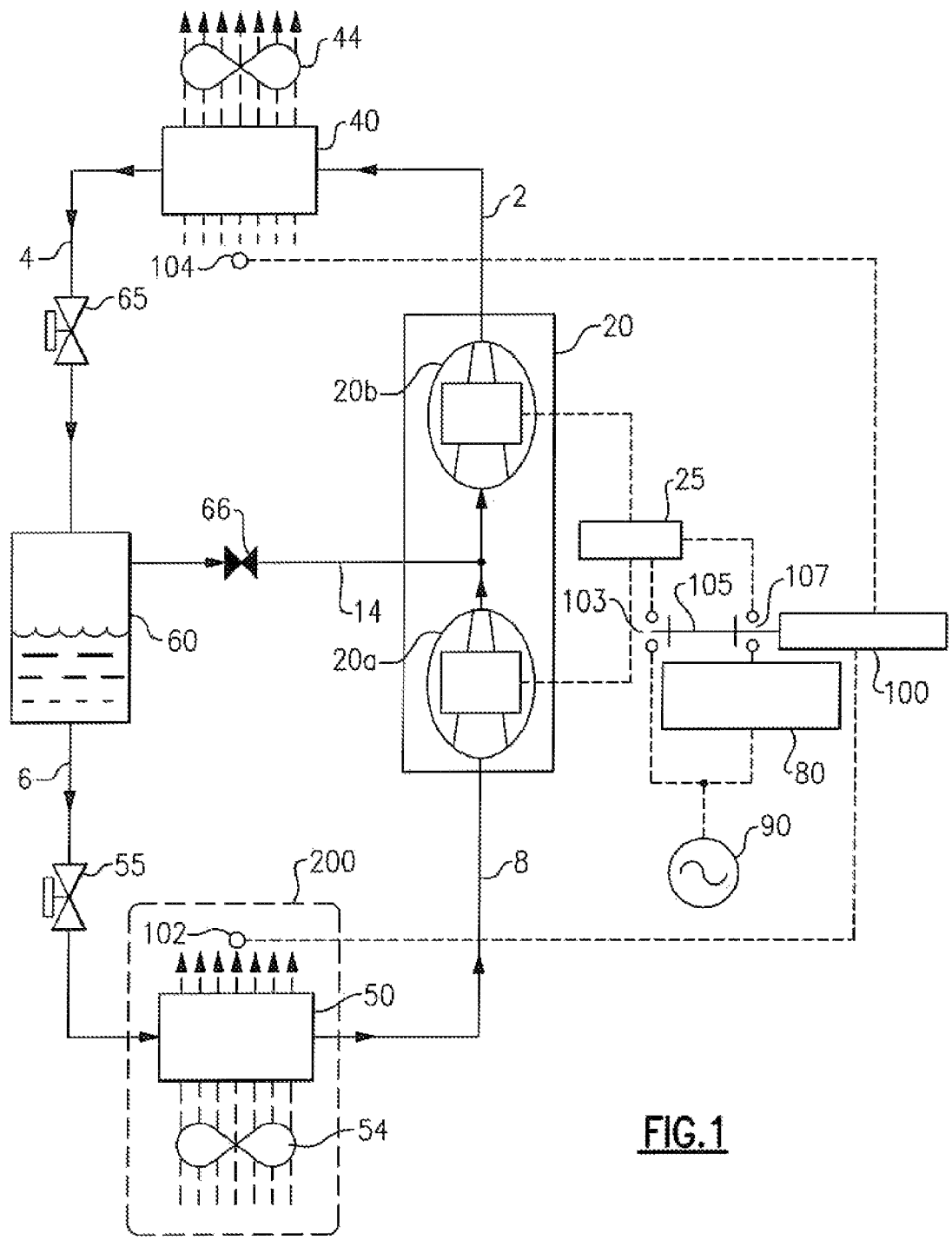
FIG. 1 is a schematic diagram illustrating a first exemplary embodiment of a refrigeration system including a variable speed drive.
Figure 2:
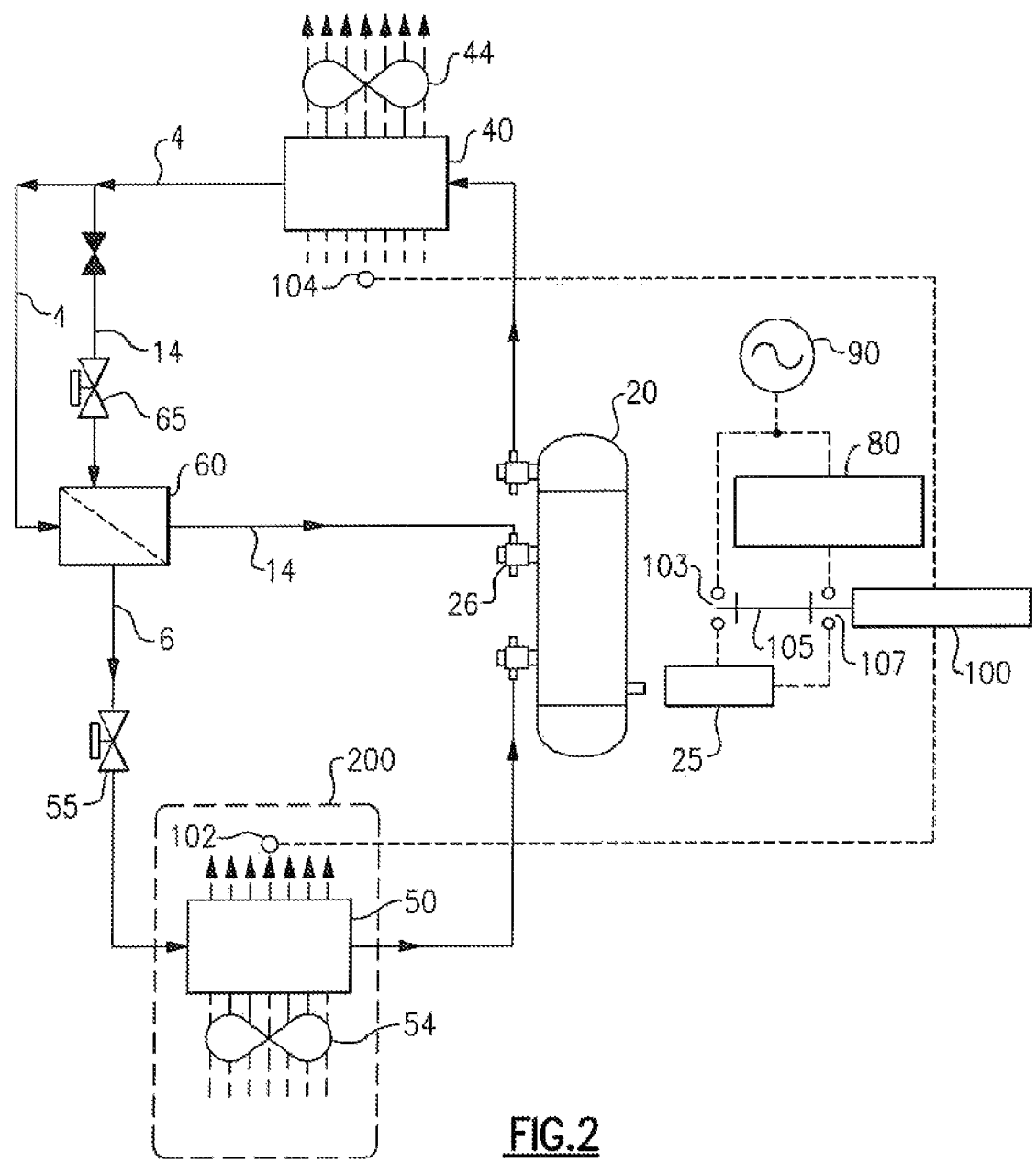
FIG. 2 is a schematic diagram illustrating a second exemplary embodiment of a refrigeration system including a variable speed drive.

Referring now to FIGS. 1 and 2, there are depicted therein exemplary embodiments of a refrigeration system 10, also referred to as refrigerant vapor compression system, suitable for use in a transport refrigeration application for refrigerating the air or other gaseous atmosphere within a temperature controlled cargo space of a truck, trailer, container or the like for transporting perishable/frozen goods.

The refrigerant vapor compression system 10 is particularly suited for, but not limited to, operation in a transcritical cycle with a low critical temperature refrigerant, such as for example, but not limited to, carbon dioxide. However, it is to be understood that the refrigerant vapor compression system 10 may also be operated in a subcritical cycle with a higher critical temperature refrigerant such as conventional hydrochlorofluorocarbon and hydrofluorocarbon refrigerants.

The refrigerant vapor compression system 10 includes a compression device 20 driven by a motor 25 operatively associated therewith, a refrigerant heat rejecting heat exchanger 40, a refrigerant heat absorbing heat exchanger 50, also referred to herein as an evaporator, and a primary expansion device 55 disposed downstream with respect to refrigerant flow of the refrigerant heat rejection heat exchanger 40 and upstream with respect to refrigerant flow of the refrigerant heat absorption heat exchanger 50, connected in a closed loop primary refrigerant circuit in series refrigerant flow arrangement by various refrigerant lines 2, 4, 6 and 8. Additionally, the refrigerant vapor compression system 10 may include an economizer refrigerant circuit including an economizer 60, secondary expansion device 65, an economizer refrigerant line 14 and a refrigerant flow control valve 66 disposed in the economizer refrigerant line 14. The economizer 60 is disposed in the primary refrigerant circuit downstream with respect to refrigerant flow of the refrigerant heat rejecting heat exchanger 40 and upstream with respect to refrigerant flow of the primary expansion device 55. Each of the primary expansion device 55 and the secondary expansion device 65 may, for example, be electronic expansion valves.

In the embodiment depicted in FIG. 1, the compression device 20 comprises a two-stage compression device, such as, but not limited to, a reciprocating compressor, that carries out a two-stage compression process with the partially compressed refrigerant leaving the first stage 20a of the compression process entering the second stage 20b of the compression process wherein the refrigerant is further compressed or a first compressor 20a and a second compressor 20b disposed in series refrigerant flow relationship with a refrigerant line interconnecting the discharge outlet of the first compressor 20a with the suction inlet of the second compressor 20b. In this embodiment, the refrigerant injection line 14 opens in fluid flow communication to and is injected into the two-stage compression device intermediate the first stage or first compressor 20a and the second stage or second compressor 20b. In the embodiment depicted in FIG. 2, the compression device 20 comprises a scroll compressor having an injection port opening to the compression chamber thereof at an intermediate pressure stage of the compression process and in fluid flow communication with refrigerant injection line 14.

The motor 25 operatively associated with the compression device 20 for driving the compression device 20 may be a variable speed motor powered by an alternating current (AC) power source 90 either directly or through a variable speed drive 80, such as an inverter drive. When operating on line frequency current supplied directly from the AC power source 90, the motor 25 drives the compression device 20 at a constant speed. When operating on variable frequency current supplied through the variable speed drive 80, the speed of the motor will be dependent upon the frequency of the current supplied and the motor 25 will therefor drive the compression device at a controlled speed which may be selectively varied.

The refrigerant heat rejection heat exchanger 40 may comprise a finned tube heat exchanger, such as for example, a fin and round tube heat exchange coil or a fin and flat mini-channel tube heat exchanger. When the refrigerant vapor compression system 10 is operating in a transcritical cycle, the refrigerant heat rejecting heat exchanger 40 functions as a gas cooling heat exchanger through which hot, high pressure refrigerant vapor discharging from the compression device 20 passes in heat exchange relationship with a cooling medium to cool the refrigerant vapor passing therethrough, but not condense the refrigerant vapor to refrigerant liquid. When the refrigerant vapor compression system 10 is operating in a subcritical cycle, the refrigerant heat rejecting heat exchanger 40 functions as a refrigerant condensing heat exchanger through which hot, high pressure refrigerant vapor discharging from the compression device 20 passes in heat exchange relationship with a cooling medium to condense the refrigerant passing therethrough from a refrigerant vapor to refrigerant liquid. In transport refrigeration system applications, the cooling medium is typically ambient air passed through the heat exchanger 40 in heat exchange relationship with the refrigerant by means of fan(s) 44 operatively associated with the heat exchanger 40.

The evaporator 50 constitutes a refrigerant evaporating heat exchanger, such as a conventional finned tube heat exchanger, such as for example a fin and round tube heat exchange coil or a fin and mini-channel flat tube heat exchanger, through which expanded refrigerant having traversed the expansion device 55 passes in heat exchange relationship with a heating fluid, whereby the refrigerant is vaporized and typically superheated. The heating fluid passed in heat exchange relationship with the refrigerant in the evaporator 50 may be air passed through the evaporator 50 by means of fan(s) 54 operatively associated with the evaporator 50, to be cooled and commonly also dehumidified, and thence supplied to the temperature controlled cargo space 200 associated with the transport refrigeration system 10 wherein a perishable product, such as for example refrigerated or frozen food items, fruit or vegetables, is housed during transport.

In the exemplary embodiment depicted in FIG. 1, the economizer 60 is depicted as a flash tank economizer and the secondary expansion valve 65 is disposed in refrigerant line 4 of the primary refrigerant circuit upstream of the flash tank economizer 60 whereby all the refrigerant flow passing through the primary refrigerant circuit traverses the secondary expansion valve and is expanded to a lower pressure and lower temperature prior to entry into the flash tank. In this embodiment, the refrigerant vapor injection line 14 establishes refrigerant flow communication between a vapor portion of the separation chamber within the flash tank economizer 60 and an intermediate stage of the compression process. Injection of refrigerant vapor into the intermediate pressure stage of the compression process would be accomplished by injection of the refrigerant vapor into the refrigerant passing from the first compression stage 20a into the second compression stage 20b of the compression device 20. In this embodiment, the refrigerant flow control valve 66, for example an economizer solenoid valve (ESV) having an open position and a closed position, may be interdisposed in refrigerant line 14 between the economizer 60 and the compression device 20. When the economizer solenoid valve 66 is open, refrigerant vapor may pass through refrigerant line 14 from the economizer 60 to the intermediate stage of the compression process, but not when the economizer solenoid valve 66 is in its closed position.

In the embodiment depicted in FIG. 2, the economizer 60 is depicted as a refrigerant-to refrigerant economizer. In this embodiment, the economizer refrigerant line 14 taps into refrigerant line 4 upstream of the economizer 60 and extends through the economizer heat exchanger 60 to open in fluid flow communication with the intermediate pressure port 26 of the scroll compressor 20. When the economizer is in operation, the portion of the refrigerant passing through refrigerant line 14 passes through the economizer 60 in heat exchange relationship with the remainder of the refrigerant passing through refrigerant line 4. In this embodiment, the secondary expansion valve 65 is disposed in upstream refrigerant line 14 upstream of the economizer heat exchanger 60 and only the diverted portion of the refrigerant flow traverses the secondary expansion device 65 wherein it is expanded to a lower pressure and temperature prior to passing in heat exchange relationship with the main flow of refrigerant passing into through the economizer 60 from refrigerant line 4. The expanded refrigerant, which is heated as it passes through the economizer 60, passes through the downstream leg of refrigerant line 14 to be injected through the injection port 26 into an intermediate pressure point of the compression process in the scroll compression device 20. In this embodiment, the economizer flow control valve 66 may be disposed in the upstream leg of refrigerant line 14, as illustrated in FIG. 2, or in the downstream leg of refrigerant line 14 as desired.

The refrigerant vapor compression system 10 also includes a controller 100 and various sensors operatively associated therewith for monitoring selected system parameters. The controller 100 monitors the various sensors operatively associated therewith, including a temperature sensor 102 for sensing the temperature of the air leaving the evaporator 50 and returning to the temperature controlled space 200, referred to herein as the evaporator return air temperature, and a temperature sensor 104 for sensing the temperature of the ambient air. The controller 100 may also monitor various pressure sensors and temperature sensors (not shown) associated with the primary refrigerant circuit for sensing operational parameters, such as, for example, but not limited to, refrigerant suction temperature, refrigerant suction pressure, refrigerant discharge temperature, refrigerant discharge pressure, and refrigerant evaporator outlet temperature. The controller 100 also controls the operation of the primary expansion device 55 and the secondary expansion device 65 and the opening or closing of the economizer refrigerant flow control valve 66 to selectively modulate or otherwise control the flow of refrigerant through primary refrigerant circuit and the economizer refrigerant circuit.

The controller 100 also controls operation of the fans 44 and 54 associated, respectively, with the refrigerant heat rejection heat exchanger 40 and the evaporator 50, as well as the operation of the compression device 20 and operation of the variable speed drive 80 to control the speed of the motor 25 driving the compression device 20, over a wide range of ambient temperature and box temperature, that is the temperature of the return air supply to the evaporator from the temperature controlled environment. The controller 100 also controls switching of the drive motor 25 between a supply of line current from the AC power source 90 at a constant frequency to drive the compression device 20 in a constant speed mode or a supply of current from the variable speed drive 80 at a frequency which may be selectively varied to drive the compression device 20 in a variable speed mode.

Figure 3:
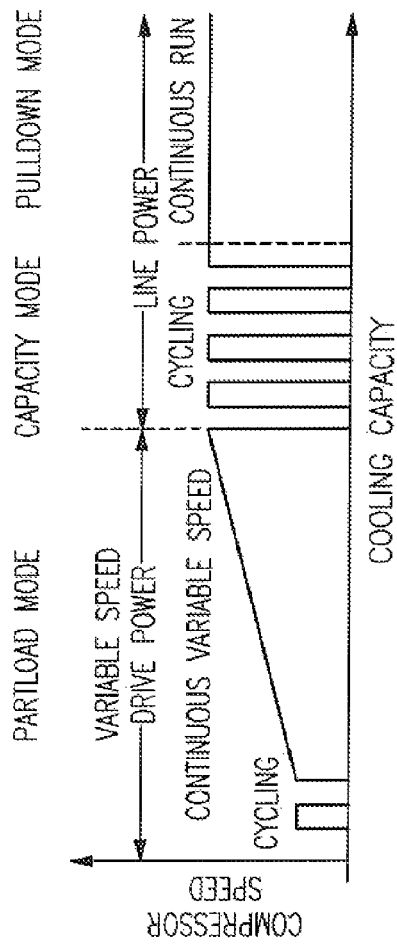
FIG. 3 is a graphical illustration of a first exemplary sequence of operation.
Figure 4:
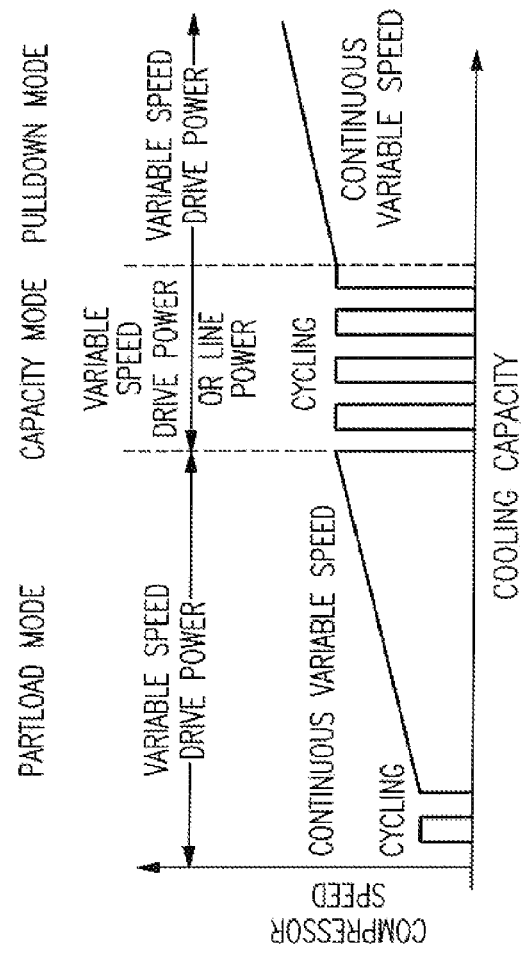
FIG. 4 is a graphical illustration of a second exemplary sequence of operation.

Depending on the ambient temperature and the desired box temperature, there exist several cooling modes of operation for the refrigeration system, including a pull down mode during system start-up, a capacity mode and a part load mode. The controller 100 will determine whether to operate the refrigeration system 10 in a pull down mode, a capacity mode or a part load mode depending on the temperature control requirements. The system is typically started in the pull down mode where the temperature controlled space 200 is at a higher temperature than the desired temperature. In this mode, the temperature within the controlled space temperature is pulled down to the desired temperature, generally as rapidly as possible. During this mode, the maximum cooling capacity is required. The economizer 60 may or may not be used during this mode, depending on the power draw and capacity requirement of the compression device 20. The controller 100 can either run the compression device 20 at fixed speed, as illustrated in FIG. 3, by applying the power source 90 directly to the motor 25, or can apply the power source 90 to the variable speed drive 80 and vary the frequency to drive the compression device 20 via variable speed drive to match capacity more precisely to cooling demand during pull down stage, as illustrated in FIG. 4. The controller 100 includes a switching device 105 for selectively switching the power supply to the compression device drive motor 25 between a direct connection 103 to the AC power source 90 and an indirect connection 107 to the AC power source 90 through the variable speed drive 80. The controller 100 may also use the switching device 105 to cycle the compression device 20 between power on and power off.

The controller 100 operates the refrigeration system 10 in the capacity mode of operation when the temperature control required for the particular product stored in the temperature controlled cargo space 200 is not extremely tight. In this mode, the controller 100 will cycle, i.e. switch, the compression device 20 between a power-on status and power-off state based on the box temperature control range. In the capacity mode of operation, when the compression device 20 is on, it is designed to obtain maximum capacity and efficiency with economizer circuit and specific speed as required for optimization of the performance. The controller 100 will switch the compressor off when the cargo temperature is below the desired cargo temperature by a certain value in order to minimize power consumption. In the capacity mode of operation, when the cargo temperature is above the desired cargo temperature by certain value, the controller 100 will switch the compression device 20 on to run at full capacity. During this mode, the variable speed drive 80 can be bypassed or stay in the system to deliver a desired capacity.

In the part load mode of operation, the compression device 20 is operated at a selected cooling capacity that is less than its maximum cooling capacity by reducing the compressor speed to a selected speed less than the maximum compressor speed. Operation in the part load mode of operation may be further divided into a continuous running mode and a cycling mode. In the continuous running mode, accurate temperature control of the cargo space is required. In this mode, the controller 100 employs the variable speed drive 80 to control the operation of the drive motor 25 to selectively vary the speed of the compression device 20 thereby adjusting the cooling capacity output of the refrigeration system 10 to more precisely match the part load cooling demand. If the readings of evaporator supply air temperature received from the temperature sensor 102 are below a certain pre-specified range of box set point, then controller 100 will first decrease the frequency of the variable speed drive to slow down the compressor, thereby reducing refrigerant mass flow and reducing the cooling capacity output of the refrigeration system 10. The controller 100 will continue to control the refrigeration system in this manner by increasing or decreasing the speed of compression device 20 to maintain the evaporator supply air temperature within a desired range of the set point temperature for the particular product within the temperature controlled cargo space 200.

When the capacity requirement is less than even the lowest speed of the compressor capacity, for example, low ambient temperature with perishable cargo, the controller 100 will start to cycle, that is alternating power on and power off, the compression device 20 in order to reduce the cooling capacity output of the refrigeration system 10 to meet the low cooling demand. In this case, the controller 100 will employ the variable speed drive 80 to control the motor 25 to run the compression device 20 at a minimum speed to reduce refrigerant mass flow to a minimum when the compression device 20 is powered on. Of course, when the compression device 20 is powered off, there is no refrigerant mass flow through the primary refrigerant circuit and the cooling capacity output of the refrigeration system 10 is zero.

These sequences of compression device speed control and power-on/power-off cycling in relation to refrigeration system cooling capacity control are illustrated in the FIGS. 3 and 4. In the case of only applying variable speed drive compression to part load control and using direct line power during the pull down and capacity modes of operation, as illustrated in FIG. 3, the variable speed drive 80 can be designed much smaller, thereby minimizing cost and avoiding power loss due to variable speed drive at pull down and capacity modes of operation. In the case of applying variable speed drive power to both pull down and part load modes of operation and allowing cycling of the compressor at capacity mode, as illustrated in FIG. 4, the size of the compression device 20 may be reduced when applying maximum speed during pull down. Therefore the part load and capacity modes of operation, efficiency will be improved due to the smaller size of the compression device 20. The cycling of the compression device 20 in the capacity mode of operation will provide better efficiency than variable speed control in this mode.

The terminology used herein is for the purpose of description, not limitation. Specific structural and functional details disclosed herein are not to be interpreted as limiting, but merely as basis for teaching one skilled in the art to employ the present invention. While the present invention has been particularly shown and described with reference to the exemplary embodiments as illustrated in the drawing, it will be recognized by those skilled in the art that various modifications may be made without departing from the spirit and scope of the invention. Those skilled in the art will also recognize the equivalents that may be substituted for elements described with reference to the exemplary embodiments disclosed herein without departing from the scope of the present invention.

Therefore, it is intended that the present disclosure not be limited to the particular embodiment(s) disclosed as, but that the disclosure will include all embodiments falling within the scope of the appended claims.

We claim:

1. A refrigeration system for a transport refrigeration unit for cooling a temperature controlled cargo space, said refrigeration system comprising:

a primary refrigerant circuit including a refrigerant compression device, a refrigerant heat rejection heat exchanger downstream of said compression device, a refrigerant heat absorption heat exchanger downstream of said refrigerant heat rejection heat exchanger, and a primary expansion device disposed downstream of said refrigerant heat rejection heat exchanger and upstream of said refrigerant heat absorption heat exchanger;

a motor operatively associated with said compression device for driving said compression device;

a variable speed drive operatively associated with said motor for varying the speed of operation of said compression device;

and a controller operatively associated with said variable speed drive and said compression device for controlling a cooling capacity of the refrigeration system by selectively controlling the speed of said compression device wherein the controller is configured to operate the variable speed drive in modes including:

a pull down mode in which the temperature controlled cargo space is at a temperature higher than a desired temperature and the controller is configured to cool the temperature controlled cargo space rapidly using maximum cooling capacity of the system by operating the compression device in a continuous run mode;

a capacity mode of operation in which the controller is operable to maintain the temperature in the temperature controlled cargo space within a temperature range by operating the compression device in a power on/off cycling mode at a fixed speed;

a part load mode of operation, in which the controller is operable to operate the compression device at a cooling capacity that is less than a maximum cooling capacity by reducing the speed of the compression device to a speed less than the maximum seed of the compression device, the controller being configured to operate the compression device in a continuous run, variable speed mode in a first portion of the part load mode and a power on/off cycling run, fixed speed mode in a second portion of the part load mode.

2. A refrigeration system as recited in claim 1 wherein said controller includes a switching circuit for selectively switching operation of said compression device between a fixed speed operating mode and a variable speed operating mode.

3. A refrigeration system as recited in claim 1 wherein said controller matches the cooling capacity of the refrigeration system to a cooling demand associated with the cargo space over a range of operation from a maximum cooling capacity associated with temperature pull down in the cargo space to a minimum cooling capacity associated with temperature maintenance in the cargo space at part load operation.

4. A refrigeration system as recited in claim 1 wherein said motor comprises a variable frequency controlled motor.

5. A refrigeration system as recited in claim 1 wherein said compression device comprises a scroll compressor.

6. A refrigeration system as recited in claim 1 wherein said compression device comprises a multi-stage reciprocating compressor.

7. A refrigeration system as recited in claim 1 wherein said compression device comprises a first compressor and a second compressor disposed in series refrigerant flow communication with a discharge outlet of the first compressor in refrigerant flow communication with a suction inlet of the second compressor.

8. A refrigeration system as recited in claim 1 further comprising:

an economizer refrigerant circuit including an economizer disposed in the primary refrigerant circuit downstream of said refrigerant heat rejection heat exchanger and upstream of said primary expansion device, a secondary expansion device disposed in the primary refrigerant circuit downstream of said refrigerant heat rejection heat exchanger and upstream of said economizer, an economizer refrigerant line establishing refrigerant flow communication between said economizer and an intermediate pressure stage of said compression device, and a refrigerant flow control valve disposed in said economizer refrigerant line.

9. A refrigeration system as recited in claim 8 wherein said economizer comprises a flash tank.

10. A refrigeration system as recited in claim 8 wherein said economizer comprises a refrigerant-to-refrigerant heat exchanger.

11. A refrigeration system as recited in claim 8 wherein said controller includes a switching circuit for selectively switching operation of said compressor between a fixed speed operating mode and a variable speed operating mode.

12. A refrigeration system as recited in claim 8 wherein said controller matches the cooling capacity of the refrigeration system to a cooling demand associated with the cargo space over a range of operation from a maximum cooling capacity associated with temperature pull down in the cargo space to a minimum cooling capacity associated with temperature maintenance in the cargo space at part load operation.

13. A refrigeration system as recited in claim 1 wherein the refrigeration system operates in a transcritcial refrigeration cycle.

14. A refrigeration system as recited in claim 13 wherein the refrigerant is carbon dioxide.

15. A method for operating a refrigeration system for a transport refrigeration unit for cooling a temperature controlled cargo space, the refrigeration system including a refrigerant compression device and a motor operatively associated with the compression device for driving the compression device, said method comprising:

providing a variable speed drive for controlling the speed of operation of the motor to selectively varying a speed of the refrigerant compression device;

providing a controller operatively associated with said variable speed drive, said controller determining whether to operate the refrigeration system in a pull-down mode, in a capacity mode or in a part load mode in response to temperature control requirements and whether to operate the refrigerant compressor at a fixed speed or a variable speed to match a cooling capacity of the refrigeration system to a cooling demand associated with the cargo space in each of the pull down mode, the capacity mode and the part load mode;

operating the refrigerant compression device in a continuous run mode in the pull down mode;

operating the refrigerant compression device in a power on/off cycling mode at a fixed speed in the capacity mode;

operating the refrigerant compression device in a continuous run, variable speed mode in a first portion of the part load mode; and and operating the refrigerant compression device in a power on/off cycling run, fixed speed mode in a second portion of the part load mode.

* * * * *